Figure 2:
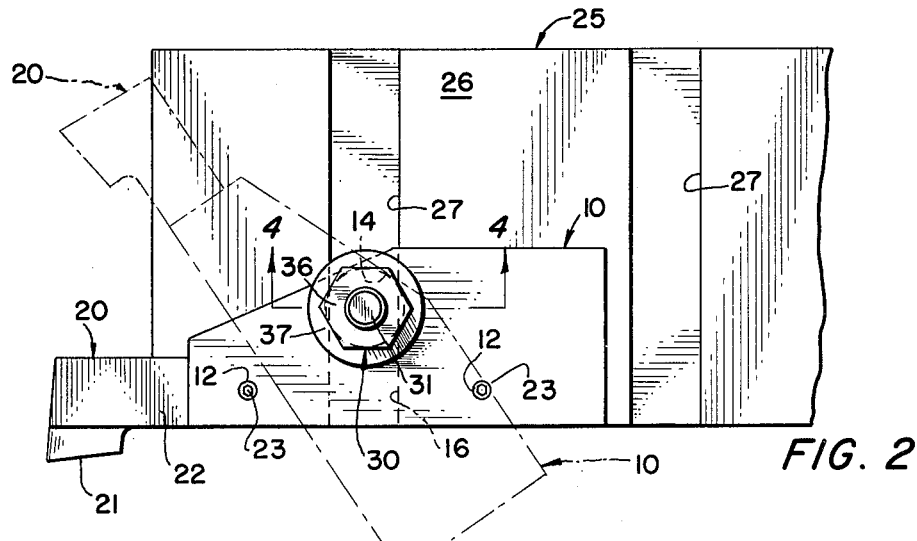

May 25, 1965   H. L. FAUST ETAL   3,185,004
TOOL HOLDING ASSEMBLY

Filed May 28, 1963   2 Sheets-Sheet 1

INVENTORS
RICHARD GARLAND
HOWARD L. FAUST
BY Charles J. Worth
AGENT

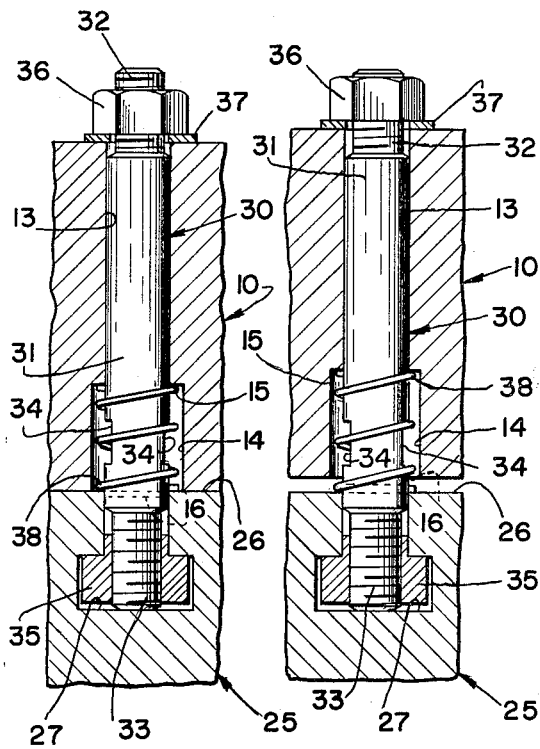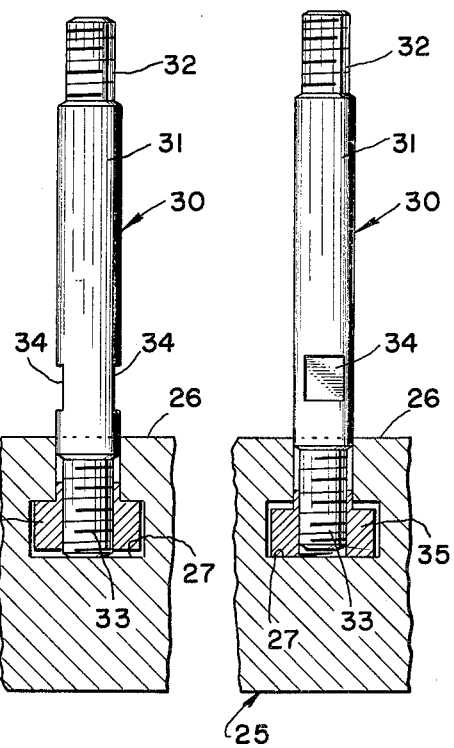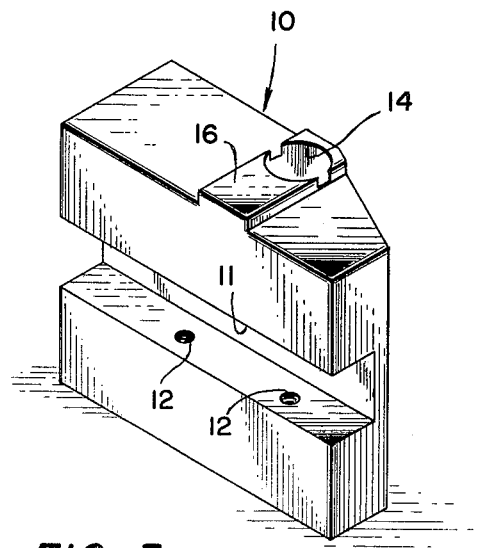

3,185,004
TOOL HOLDING ASSEMBLY
Howard L. Faust, Bethlehem, and Richard Garland, Philadelphia, Pa., assignors to Ingersoll-Rand Company, New York, N.Y., a corporation of New Jersey
Filed May 28, 1963, Ser. No. 283,874
5 Claims. (Cl. 82—37)

This invention relates to machine tools such as lathes and the like, and more particularly to tool holding devices therefore.

Present day tool holding devices of this type fall into two primary categories. The first is of the type holder that is immovable after the machine is setup, and the second is of the pivotal type holder which loses its preset position when removed and is extremely complicated and costly to manufacture. Examples of the latter are found in U.S. Patents 1,141,854 granted to F. D. Van Norman on June 1, 1915; 1,688,284 granted to R. Milecz on October 16, 1928; 2,168,162 granted to J. R. Jackson on August 1, 1939; and 2,684,608 granted to A. F. Roman on July 27, 1954.

Accordingly, an object of the pesent invention is to provide a tool holding assembly for machine tools such as lathes and the like which permits pivotation and/or removal of said tool from the machine without loss of a setup position and which is simple of construction and relatively inexpensive to manufacture.

Another object of the present invention is to provide a tool holding assembly as above wherein a novel post arrangement is provided for supporting a tool holder similar to those presently immovably mounted.

And, another object of the present invention is to provide a tool holding assembly comprising a post which is locked in a preset location relative to the bed or rest of a machine and which pivotally mounts a tool holder or block to be locked in a fixed position relative to said bed for machine operation.

Still, another object of this invention is to provide the foregoing tool holding assembly wherein the tool holding block and the tool held thereby may be removed without disturbing the preset location of the post and the tool mounted on said block and locked to the bed or rest of a machine.

This invention contemplates a tool holding assembly for use with a machine bed with inverted T-slots, comprising a tool holding block having a through bore that is counterbored at one end to form an annular flange, a base member adapted to slide in a T-slot in a machine bed, a post extending through the bore for pivotably mounting said block and being provided with threaded ends, one of the post ends being adapted to extend into a T-slot and threadedly engage said base to lock the post in a desired position, a spring encircling said post being disposed in the counterbore engaging the formed shoulder at one end and adapted to engage the machine bed in which the base is disposed to urge said block away from said base, means threadedly engaging the other of said post ends for urging said block against the force of said spring into engagement with the bed in which the base is disposed to lock said block in a desired position.

The foregoing and other objects and advantages will appear more fully hereinafter from a consideration of the detailed description which follows, taken together with the accompanying drawings wherein one embodiment of the invention is illustrated by way of example. It is to be expressly understood, however, that the drawings are for illustration purposes only and are not to be construed as defining the limits of the invention.

Figure 1:
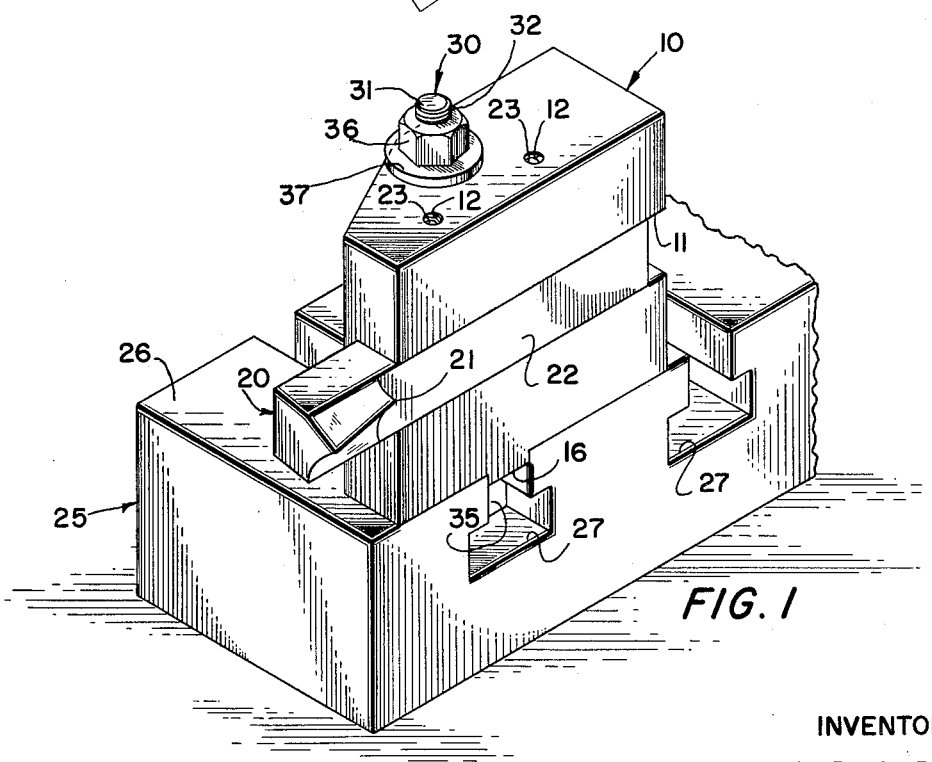

FIGURE 1 is a perspective view of a portion of a machine bed or rest upon which is mounted a tool holding assembly made in accordance with the present invention, FIGURE 2 is a plan view of the machine bed or rest and the novel tool holding assembly of FIGURE 1, FIGURE 3 is a perspective view of the tool holding block of FIGURES 1 and 2 in an inverted position, FIGURES 4 and 5 are sectional views taken on line 4—4 of FIGURE 2 illustrating the tool holding block of the novel tool holding assembly locked against rotation on its supporting post in FIGURE 4 and free to rotate in FIGURE 5, and FIGURES 6 and 7 are views similar to FIGURES 4 and 5 in which the tool mounting block has been removed in each instance and the post is locked against movement relative to a machine bed in FIGURE 6, and in which the post is free to slide relative to the machine bed in FIGURE 7.

Referring now to the drawings and particularly to FIGURES 1 and 2, a machine bed or rest 25 has a plurality of parallel inverted T-slots 27 intersecting the upper bed surface 26. A tool holder assembly made in accordance with the present invention includes a slide base or nut 35 adapted to be disposed in one of the T-slots 27 and which supports a post 30. When the machine is set up for operation, the post 30 and the slide base 35 are locked in position against movement in the slot 27. A tool holding block 10 is pivotally mounted on the post 30 and is locked against movement thereon by a nut 26 threaded on the upper end 31 of the post. A washer 37 may be disposed between the block 10 and the nut 36, as shown.

A tool 20 having a cutting edge 21 includes a shank portion 22 that is disposed in a slot 11 in the mounting block 10. Tool 20 may be held in any conventional manner such as a wedge (not shown) or by studs 23 threadedly disposed in threaded openings 12 in the block 10.

Referring also to FIGURES 3 to 7, slide 35 disposed in slot 27 has a threaded opening to receive a threaded lower end 33 of post 30. When a preset location is determined, post 30 is rotated by a tool (not shown) which engages a pair of flats 34. The slide base 35 is held against roation by slot 27. Thus, rotation of post 30 relative to base 35 is attended by relative axial movement therebetween until the lower post end 33 and the slide base 35 move into engagement with opposite portions of slot 27, as shown in FIGURE 5. This locks the slide 35 and the post 30 against movement.

A coil spring 38, or equivalent means thereof, encircles post 30 and rests on the upper surface 26 of the machine bed or rest 25. Tool holding block 10 has a depending lug 16 and a through bore 13 for post 30 which also extends through the lug 16. Bore 13 has a counterbore 14 at its lower end to house the spring 38 and to form a shoulder 15 which is engaged by the upper end of such spring. Lug 16 extends across the bottom of block 10 and is substantially normal to its face surface. When novel tool holding assembly is in condition for machine operation, as shown in FIGURES 1 and 2, lug 16 and slot 27 cooperate as a detent/indent arrangement to prevent block 10 from pivoting on post 30. A washer 37 may be placed on the post 30 and a nut 36 is threaded on the upper end 32 thereof to prevent the block from being unintentionally removed.

As shown in FIGURE 5, spring 38 acting between top surface 26 of the machine bed or rest 25 and shoulder 15 maintains the tool holding block 10 in an elevated position. At this time, lug 16 is disposed out of slot 27 so block 10 is free to rotate or pivot on post 30. When the tool 20 is to be used, nut 36 is further threaded on end 32 of post 30 urging tool holding block 10 toward top surface 26 of the machine bed or rest 25 against the force of spring 38. Thus, the block is clamped between the washer 37 and the top surface 26. This moves lug or detent 16 into a slot or indent 27 to hold block 10 immovable and tool 20 in the desired machine operating position.

If, during second step machining, another tool or fixture is required which cannot be mounted on the bed or rest 25 of the machine because of interference by the tool holding block 10, nut 36 may be backed off to the position shown in FIGURE 5. The block 10 again is free to pivot on post 30 as shown in construction lines in FIGURE 2. Should removal of block 10 be required, nut 36 and washer 37 are fully removed from post 30 thus permitting removal of the block and spring 38. The post 30, however, remains in its locked preset position as shown in FIGURE 6. As should be readily seen, another tool holding block (not shown) with a different tool then may be mounted on post 30 in a similar manner as was tool holding block 10.

When the setup of the machine is to be changed, a tool (not shown) engages flats 34 for rotating the post 30 relative to slide base 35. Such rotation causes unthreading between the base 35 and the lower threaded post end 33, such end 33 recedes within the confines of the base thus freeing them for movement in slot 27 relative to the machine bed or rest 25, as shown in FIGURE 7.

In view of the foregoing, it should now be readily understood that a novel tool holding device is provided which has a slide base adapted to be disposed in a slot in the bed or rest of a machine. A post has a threaded bottom end engaging a threaded opening in the base which when rotated, causes axial movement therebetween until the threaded end and base engage opposite sides of the slot to lock the post in a predetermined position. A tool holding block then is disposed on the post with spring means acting between the bed and the block to maintain such block in an elevated out of detent position. Thus, the block and the tool held thereby is free to be pivoted on the post. Threaded locking means is provided at the top end of the post for urging the block against the force of the spring to clamp the block in a detent position immovably against bed when the tool is to used. The block and the tool held thereby may be released to be rotated on the post or removed therefrom without upsetting the post setup of the machine.

Alhough but a single embodiment of the invention has been illustrated and described in detail, it is to be expressly understood that the invention is not limited thereto. Various changes may also be made in the design and arrangement of the parts without departing from the spirit and scope of the invention as the same will now be understood by those skilled in the art.

We claim:

1. A tool holding assembly for a machine having a bed with an inverted T-slot, comprising:
   (a) a block for holding a tool and having a bore therethrough that is counterbored at one end to form an annular flange;
   (b) a base member adapted to be slidably disposed in an inverted T-slot in a machine bed;
   (c) a post member extending through the bore to pivotally support said block, having one end adapted to extend into the slot in which the base member is disposed, and being connected to said base member;
   (d) said members being movable axially relative to one another into frictional engagement with the slot in which said base member is disposed to lock said base member against movement;
   (e) spring means disposed in the counterbore having one end engaging the formed flange and its other end adapted to engage the bed with the slot in which said base member is disposed for biasing said block away from said base member; and
   (f) means mounted on the other end of said post member from said base member to hold said block on said post member and being movable axially relative to said post member to urge said block against the spring means into engagement with the bed having the slot in which said base member is disposed to lock said block against pivoting.

2. A tool holding assembly in accordance with claim 1; and
   (a) said block having a depending lug adapted to engage the slot in which said base member is disposed when said block is urged against the spring means to provide a detent lock to oppose block pivotation.

3. A tool holding assembly for a machine having a bed with an inverted T-slot, comprising:
   (a) a block for holding a tool and having a bore therethrough that is counterbored at on end;
   (b) a base member adapted to be slidably disposed in an inverted T-slot in a machine bed;
   (c) a post member extending through the bore to pivotally support said block and having a pair of threaded ends;
   (d) one of said ends of said post member threadedly engaging said base member and being movable axially by relative rotation between said members so said one of said ends of said post member and said base member engage opposite sides of the slot in which said base member is disposed to lock said post and base members against movement;
   (e) spring means encircling said post member having one end disposed in the counterbore and its other end engaging the bed biasing said block away from said base member;
   (f) and a nut threadedly engaging the other of said ends of said post member to hold said block on said post and being movable axially by rotation to move said block against the spring and into engagement with the bed having the slot in which said base member is disposed to lock said block against movement.

4. A tool holding assembly in accordance with claim 3; and
   (a) said block having a depending lug adapted to engage the slot in which said base member is disposed when said block is urged against the spring to provide a detent lock to oppose block pivotation.

5. A tool holding assembly for a machine having a bed with a slot, comprising:
   (a) first means adapted to be slidably disposed in a slot in a machine bed,
   (b) second means connected to said first means and being movable relative thereto to cause both of said means into engagement with the slot in which said first means is disposed to frictionally lock said first means against movement,
   (c) tool holding means pivotally supported on said second means,
   (d) means engaging said second means and the bed for biasing said tool holding means away from said first means,
   (e) means connected to said second means and being movable relative thereto for moving said tool holding means against said biasing means into engagement with the bed with the slot in which said first means is disposed to frictionally lock said tool holding means against pivotation, and (f) said tool holding means for engaging the slot in which said first means is disposed to provide a positive lock to prevent rotation of said tool holding means.

References Cited by the Examiner

UNITED STATES PATENTS 2,335,712  11/43  Vitale.
2,672,676  3/54  Anderson.

FOREIGN PATENTS 646,326  11/50  Great Britain.

WILLIAM W. DYER, JR., *Primary Examiner*.